United States Patent [19]

Wagner et al.

[11] 3,924,904
[45] Dec. 9, 1975

[54] GREASE FITTING ASSEMBLY INCLUDING SAFETY STOP

[75] Inventors: Joseph Francis Wagner; Ross Thomas Broderick, both of Dubuque; Joseph Edward Link, Farley; David Emmert Stover, Dubuque, all of Iowa

[73] Assignee: Deere & Company, Moline, Ill.

[22] Filed: May 1, 1974

[21] Appl. No.: 465,996

[52] U.S. Cl. .............. 305/10; 91/449; 137/625.49; 151/69
[51] Int. Cl.[2] ............... B62D 55/18; F15B 13/04
[58] Field of Search .......... 91/449; 305/10; 151/69; 137/625.49

[56] References Cited
UNITED STATES PATENTS

| | | | |
|---|---|---|---|
| 2,907,419 | 10/1959 | Klank, Jr. | 151/69 X |
| 3,260,989 | 7/1966 | Curtis | 151/69 X |
| 3,434,103 | 3/1969 | Hancock et al. | 151/69 X |
| 3,456,679 | 7/1969 | Graham | 251/367 X |
| 3,463,559 | 8/1969 | Gehrke | 91/452 X |
| 3,517,972 | 6/1970 | Williams | 305/10 |
| 3,602,284 | 8/1971 | Smith et al. | 151/69 |

Primary Examiner—Irwin C. Cohen

[57] ABSTRACT

A grease fitting assembly is provided for introducing grease into the cylinder of a hydraulic track tension adjustor. The assembly includes a grease fitting which is threadably received in a bore section of a passage leading to the adjustor cylinder. A relief port intersects the passage and the fitting cooperates with the bore so as to prevent the flow of grease through the relief port when the fitting is in a normally fully installed position. The fitting is movable to a first partially unscrewed position for permitting the flow of grease through the relief port and is movable to a further partially unscrewed position for permitting grease to flow through axial grooves formed in the outer surface of the fitting to the outer end of the bore section so as to provide an alternate passage for relieving grease in the event that the relief port becomes plugged. In order to insure that the fitting is not inadvertently unscrewed past the second partially unscrewed position to the extent that the pressurized grease will cause the fitting to be pressure disengaged from the bore, a safety stop member is provided to engage the fitting when it has been unscrewed a predetermined distance.

4 Claims, 2 Drawing Figures

GREASE FITTING ASSEMBLY INCLUDING SAFETY STOP

BACKGROUND OF THE INVENTION

The present invention relates to a hydraulic track adjustor for a track-laying tractor and more particularly relates to a grease fitting assembly for such an adjustor.

Grease fitting assemblies now in common use are generally similar to the assembly disclosed in U.S. Pat. No. 3,463,559 issued Aug. 26, 1969 to Gehrke. In the Gehrke patent, a bore forms the outer portion of a passage leading to the cylinder of the hydraulic track adjustor and the grease fitting assembly includes a grease fitting threadably received in the bore section. The grease fitting has a valve surface on the inner end thereof which cooperates with a valve seat in the bore, when the fitting is in a fully installed position, so as to prevent the escape of grease through a relief port intersecting the bore adjacent the valve seat, the fitting being movable to a partially unscrewed position for permitting the escape of grease through the relief port.

Grease fitting assemblies of the type disclosed in Gehrke are not entirely satisfactory, since the relief port may become clogged necessitating the removal of the fitting from the bore to allow the pressurized grease to escape. This operation is dangerous, since the pressurized grease may impel the fitting towards the person unscrewing the same.

SUMMARY OF THE INVENTION

According to the present invention, there is provided a grease fitting assembly which is an improvement over the type disclosed in U.S. Pat. No. 3,463,559 issued on Aug. 26, 1969 to Gehrke.

It is an object of the invention to provide a grease fitting assembly which includes a grease fitting which may be unscrewed from a fully installed position to first and second partially unscrewed positions for respectively permitting grease to flow through first and second relief passage means.

A further object of the invention is to provide a grease fitting as above described which is included in an assembly that includes a stop means for preventing the fitting from being inadvertently unscrewed beyond said second partially unscrewed position.

A more specific object of the invention is to provide a stop means which is in the form of a releasably secured member having an opening in which the upper portion of the grease fitting is received, the grease fitting having a shoulder positioned for engaging the stop member when the fitting is unscrewed beyond the second partially unscrewed position.

Another specific object of the invention is to provide a grease fitting having axially extending grooves formed on the outside thereof, the grooves serving to permit grease to flow out the bore in which the fitting is received only when the fitting is unscrewed to the second partially unscrewed position.

These and other objects will become apparent from a reading of the following description in conjunction with the appended drawing.

DESCRIPTION OF THE PREFERRED EMBODIMENT

Figure 1:
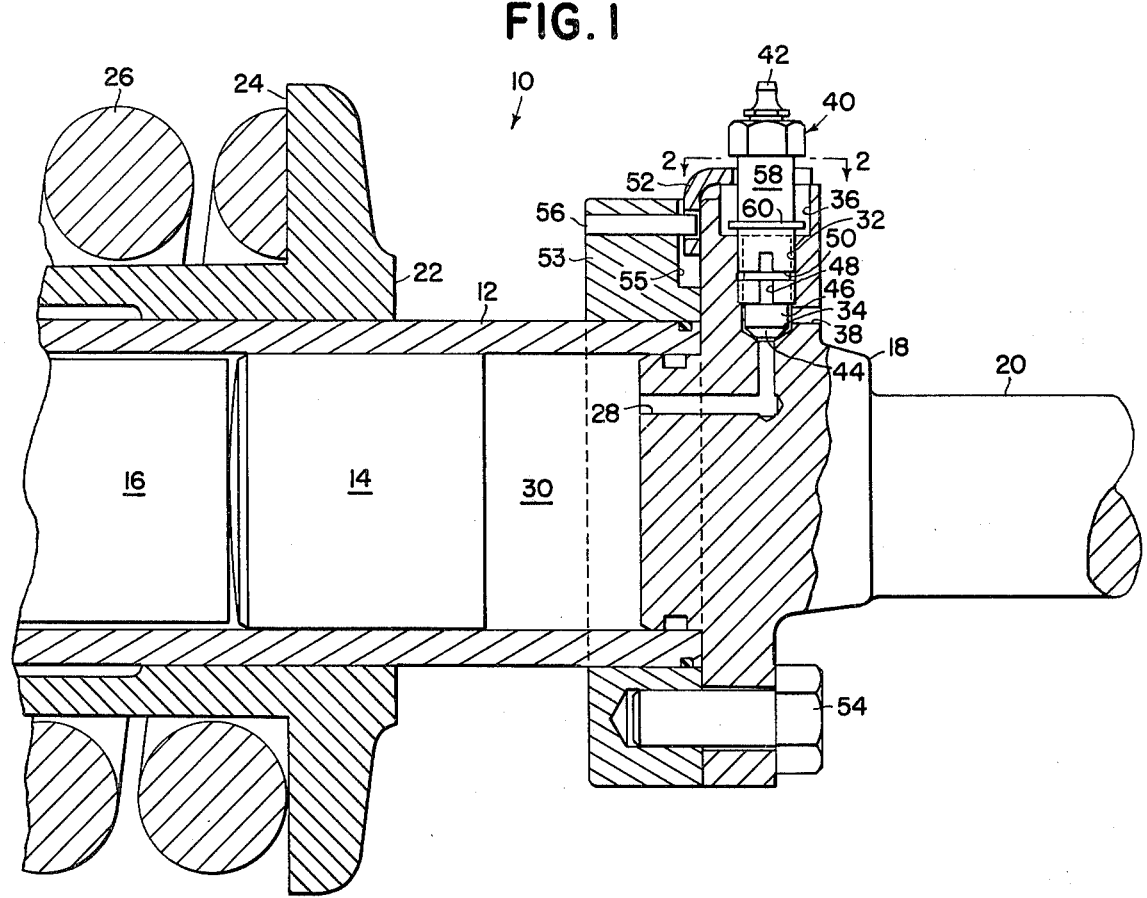
FIG. 1 is a broken, sectional view of a hydraulic track adjustor embodying a grease fitting assembly constructed according to the principles of the present invention.
Figure 2:
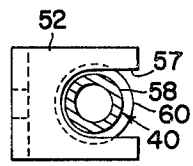
FIG. 2 is a view taken along the line 2—2 of FIG. 1.

Referring now to the drawings, therein is shown a part of a hydraulic track adjustor indicated in its entirety by the reference numeral 10. For a more detailed description of the class of track adjustors to which the adjustor 10 belongs, resort may be had to the aforementioned Gehrke patent U.S. Pat. No. 3,463,559. The track adjustor 10 includes a cylinder 12 in which is disposed right and left piston sections 14 and 16, respectively. Plugging the right end of the cylinder 12 is an end member 18 having a rod 20 integral therewith, the rod 20 being adapted for connection to a front idler in a track assembly (not shown) of a track-laying tractor. Slidably mounted on the cylinder 12 is a tubular spring retainer 22 having a left end (not shown) which cooperates with the left piston 16 such that it is moved leftwardly when the piston 16 moves leftwardly. The spring retainer 22 includes a flange 24 against which the right end of a coil compression spring 26 is engaged, the left end of the coil compression spring (not shown) being adapted for engagement with a spring retainer carried by a track frame of the track assembly. Thus, it will be appreciated that the introduction of fluid into the right end of the cylinder 12 will result in the pistons 14 and 16 acting in a direction tending to compress the spring 26 through means of the spring retainer 22, however, the preload of the spring 26 is much greater than the force required to move the front idler forwardly, therefore, the front idler moves forwardly and the track tension is increased.

For the purpose of introducing a fluid such as grease or the like into the right end of the cylinder 12, the end member 18 is provided with a fluid passage 28 having its inner end in fluid communication with an expansible and retractable chamber 30 defined by the cylinder 12, the piston 14 and the end member 18. The passage 28 includes an outer section defined by an outer bore section 32. For purposes to be explained below, the inner end of the bore section 32 is shaped so as to form an outwardly facing valve seat 34 and the outer end portion of the bore section 32 is enlarged as at 36. Intersecting the bore section 32 at a location adjacent to but spaced axially outwardly from the valve seat 34 is a relief port 38.

Threadably received in the outer bore section 32 is a cylindrical fitting 40 having its upper end defined by a nipple 42 adapted for connection to an apparatus, such as a grease gun or the like, for introducing fluid into the fitting, the latter having an axial passage (not shown) extending completely therethrough and having a one-way valve (not shown) located therein for permitting fluid to flow only in the direction of the chamber 30. The bottom end of the fitting 40 is in the form of a valve surface 44 which is in sealing engagement with the valve seat 34 when the fitting is in a fully installed position, as shown in FIG. 1. The fitting 40 has a lower portion 46 which is dimensioned relative to the bore section 32 so as to define an annular passage leading from the valve seat 34 to the relief port 38. Thus, it will be appreciated that by unscrewing the fitting 40 a distance sufficient to unseat the surface 44 from the valve seat 34, a passage will be opened by which grease may flow from the chamber 30 to the relief port 38. This operation may become necessary when, for example, it is desired to service some portion of the track assembly with which the adjustor 10 is associated.

In some instances, the relief port 38 may become plugged with foreign matter during operation and for these instances, the fitting assembly is provided with an alternate means for relieving the pressure from the chamber 30. Specifically, the exterior of the fitting 40 is provided with an axial groove 48 which extends upwardly from the lower portion 46 to an annular groove 50. The axial dimension of the groove 48 and the location of the annular groove 50 are such that the groove 50 will communicate with the enlarged outer end portion 36 of the bore section 32 when the fitting 40 has been moved to a second partially unscrewed position a predetermined distance axially outward from the first partially unscrewed position mentioned above.

In order to prevent the fitting 40 from being accidentally completely unscrewed when it is desired only to move it to its second partially unscrewed position, there is provided a safety stop member 52. The stop member 52 is in the form of an angled strap having first and second legs extending at right angles to each other. The end member 18 includes a ring-like section 53 received on the cylinder 12 and releasably fixed to the remainder of the member 18 through means of a plurality of cap screws, one of which is shown at 54. A first of the legs of the stop member 52 is disposed vertically, as shown in FIG. 1, and is received in a recess 55 located at the interface of the ring-like section 53 and the remainder of the member 18 and a pin 56 is fixed in the section 53 and projects into an opening in the vertical leg of the stop member 52 so as to hold the latter in a desired position. It is to be noted that the relative dimensions of the recess 55 and stop member 52 are such that the stop member cannot be removed without unfastening the cap screws 54. A U-shaped notch 57 is formed in the terminal end of the second leg and has an upper portion 58 of the fitting 40 located therein. Disposed so as to be adjacent the bottom of the enlarged outer end portion 36 of the bore section 32, when the fitting 40 is in its fully installed position, is an annular abutment or shoulder 60 which is formed on the outer surface of the fitting 40. The abutment 60 is dimensioned such that it will not pass through the notch 56 and it is located such that it will engage the bottom of the stop member 52 when the fitting 40 is moved to its second partially unscrewed position.

The operation of the fitting assembly is thought to be apparent from the foregoing description, therefore, a detailed description of the operation is not thought necessary. Suffice it to say that the fitting 40 cooperates with the bore section 32 so as to define alternate first and second passages for the relief of fluid pressure from the chamber 30 respectively through the relief port 38 and the upper end of the bore section 32 respectively when the fitting 40 is moved to its first and second partially unscrewed positions. Further, it is clear that the stop member 52 will prevent the fitting 40 from being inadvertently completely unscrewed when it is desired only to move it to its second partially unscrewed position.

We claim:

1. In a hydraulic track adjustor of a type including a cylinder, a piston slidably mounted in the cylinder and cooperating therewith to define an expandible and retractable grease-receiving chamber, a first passage, including a threaded bore section beginning at the exterior of the adjustor, leading to the chamber, the bore section having an inner end defining a valve seat facing outwardly, a grease inlet valve fitting threadedly received in the bore section, a relief port intersecting the bore section at a location spaced axially from but located adjacent to the valve seat, said grease inlet valve fitting having an inner end portion dimensioned so as to cooperate with the bore section to define a relief passage leading from the valve seat to the relief port, and said grease inlet valve fitting being movable between a fully inserted position wherein its inner end engages the valve seat and prevents grease from flowing from the chamber to the relief port and a first partially unscrewed position permitting grease to flow from the chamber to the relief port, the improvement comprising: said grease inlet valve fitting having axially extending groove means extending towards the outer end thereof from the inner portion thereof; the axial dimension of said groove means being such that it is not in fluid communication with the outer end of the bore section when the grease inlet valve fitting in is said first partially unscrewed position but is in fluid communication with the outer end of the bore section when the grease inlet valve fitting is unscrewed from said first unscrewed position to a second partially unscrewed position whereby an alternate passage for permitting grease to flow from the chamber is provided for cases when foreign matter prevents grease from flowing through the relief port.

2. The hydraulic track adjustor in claim 1 wherein the adjustor includes safety stop means for preventing the grease inlet valve fitting from being completely unscrewed.

3. The hydraulic track adjustor defined in claim 2 wherein a two-piece end member is provided in blocking relationship to one end of the cylinder and includes a first section disposed in abutting relationship to the one end of the cylinder and with one end of an annular second section received on said cylinder; fastener means securing said first and second sections together; said grease inlet fitting being located in said first section; said first and second sections defining a recess located adjacent said grease inlet fitting; said stop means comprises a stop member extending partly into said recess and having an opening loosely receiving an outer end portion of said grease inlet valve fitting; said grease inlet valve fitting further having a shoulder dimensioned such that it will not pass through the opening and located such that it engages the member only when the grease inlet valve fitting has been unscrewed to said second partially unscrewed position; and securing means located in said recess such as to prevent removal of said stop member when said first and second sections are secured together.

4. The track adjustor defined in claim 2 wherein said opening is a U-shaped notch.

* * * * *